United States Patent [19]
Nakayama

[11] Patent Number: 5,915,493
[45] Date of Patent: Jun. 29, 1999

[54] SENSOR FOR ELECTRIC POWER ASSISTED VEHICLE

[75] Inventor: Hironori Nakayama, Iwata, Japan

[73] Assignee: Yamaha Hatsudoki Kabushiki Kaisha, Iwata, Japan

[21] Appl. No.: 08/887,489

[22] Filed: Jul. 2, 1997

[30] Foreign Application Priority Data

Jul. 4, 1996 [JP] Japan .................................. 8-174944

[51] Int. Cl.⁶ ................................................ B62M 23/02
[52] U.S. Cl. .......................................... 180/206; 180/220
[58] Field of Search .................................. 180/205, 206, 180/207, 220; 73/862.191

[56] References Cited

FOREIGN PATENT DOCUMENTS

| | | | |
|---|---|---|---|
| 590674 | 4/1994 | European Pat. Off. ............... | 180/206 |
| 636538 | 2/1995 | European Pat. Off. ............... | 180/206 |
| 2649392A1 | 5/1977 | Germany ............................ | 73/862.191 |
| 55-63730 | 5/1980 | Japan ................................. | 73/862.191 |
| 1267-178 | 10/1986 | U.S.S.R. ............................ | 73/862.191 |
| 1610-320 | 11/1990 | U.S.S.R. ............................ | 73/862.191 |

*Primary Examiner*—Kevin Hurley
*Assistant Examiner*—William R. Zimmerli
*Attorney, Agent, or Firm*—Knobbe, Martens, Olson & Bear LLP

[57] ABSTRACT

Several embodiments of electric power-assisted manually powered vehicles such as bicycles. In these embodiments, the drive unit and control are mounted as a unit so as to minimize external wiring and to facilitate heat transfer from the control unit to the atmosphere while protecting the control unit. In some embodiments, sensors for the control unit are also mounted on the outer housing and cooperate with the internal components of the outer housing so as to provide the necessary signals for control. Several embodiments of improved torque sensors are disclosed that provide smoother operation.

24 Claims, 15 Drawing Sheets

SENSOR FOR ELECTRIC POWER ASSISTED VEHICLE

BACKGROUND OF THE INVENTION

This invention relates to an electric motor assisted vehicle and more particularly to an improved torque sensor therefor.

There have been proposed a class of vehicle wherein the vehicle is powered primarily by a manual input force of the operator. However, there is also incorporated an electric motor assist which provides assist power for assisting the operator's manual propulsion of the associated vehicle. Although the type of vehicle employed for this purpose may be of a wide variety, this type of system is frequently used on land vehicles such as bicycles that have a generally open construction.

Specifically, the type of system generally employs a manual force receiving device such as a pedal operated crank mechanism that drives a transmission for driving an output shaft for propelling the vehicle. An electric motor is employed in conjunction with this pedal operated mechanism for providing electric power assist for driving the vehicle. Generally, at least one sensor is also incorporated in this mechanism that senses the input force of the operator to the pedal operated mechanism. This sensed signal is then sent to a controller which, in turn, controls the transmission of electrical power from a battery to the electric motor for determining the amount of electric power assist.

A type of electric power assisted pedal operated vehicle of the type aforedescribed is shown in U.S. Pat. No. 5,570,752 issued Nov. 5, 1996 and assigned to the assignee hereof. As has been noted, in order to provide the requisite power assist, it is desirable to incorporate a torque sensor which will sense the manual input force to the pedal mechanism. In this way, the output force can be related to the input force so as to maintain a normal feel to the rider of the bicycle while still providing the electrical power assist.

It is also desirable to provide a sensor that senses the speed as this is useful in limiting the amount of power assist to those instances where the power assist is required as when climbing hills or accelerating from a standstill. However, it may be desirable to limit the power assist as the speed of the vehicle increases. The positioning and operation of the torque and speed sensors further complicates the overall construction.

A prior art type of torque sensor is shown in FIG. 1 and will be described by reference to that figure to describe certain of the problems attendant with the prior art type of constructions. In this figure, the outer housing of the crank assemblage is indicated generally by the reference numeral 31. Although the internal description of the crank mechanism will not be described in full detail, reference may be had to aforenoted U.S. Pat. No. 5,570,752 for the details of the construction.

Basically, a crankshaft 32 is supported for rotation within the housing 31 and carries pedals at the outer ends of its crank arms for pedal application of force to the crankshaft 32.

A transmission of a step-up type, which may include a planetary gear set, is interposed between the crankshaft 32 and the output shaft that drives a sprocket for driving the rear wheel of an associated bicycle, if this is the type of vehicle application chosen.

This transmission includes a sun gear that is carried for limited pivotal movement by a torque-sensing member 33. This member 33 has an abutment surface 34 that is adapted to engage a sensor mechanism, indicated generally by the reference numeral 35. This sensor mechanism 35 is mounted within a cavity 36 and includes a potentiometer 37. The potentiometer 37 has a shaft 38 on which a sensor arm 39 is affixed.

This sensor arm is urged by a spring assembly, indicated generally by the reference numeral 41, to resist rotation of the torque-sensing member 33. The spring assembly 41 includes a coil compression spring 42 that bears against a plunger 43 which, in turn, acts on the potentiometer arm 39. The spring 42 is loaded by means of a plate 44 and the plunger 43 has its shaft journaled within a support member 45. The degree of rotation of the potentiometer arm 39 will cause rotation of the potentiometer shaft 38 and will provide an output signal indicative of the operator input torque.

It should be readily apparent that this sensor structure requires a fairly substantial amount of space and also results in the mounting of the component in a way that they can be damaged and hence it is necessary to provide a protective plate 46 which further adds to the bulk of the mechanism and limits its space availability.

Furthermore the sliding engagement between the various components and particularly the plunger 43 and the potentiometer arm 39 and the abutment surface 34 and the arm 39 introduce hysteresis into the system. Also the sliding motion between the plunger 43 and the arm 39 can cause wear. Since all forces are taken by the potentiometer shaft 38 its bearing arrangement must be robust and hence expensive.

It is, therefore, a still further object of this invention to provide an improved sensor assembly for use with an electric power-assisted pedal operated vehicle drive mechanism.

SUMMARY OF THE INVENTION

The features of this invention are adapted to be embodied in an electric motor assisted and manual pedal operated drive assembly for a vehicle and a control therefor. The assembly is comprised of an outer housing for journaling a crankshaft for rotation about a crankshaft axis. The crankshaft has its opposite ends protruding from the outer housing and is adapted to receive crank arms and pedals for application of manual power to the crankshaft. An electric motor has a drive shaft and is supported by the outer housing. An output shaft is journaled by the outer housing for driving the associated vehicle. A transmission is contained within the outer housing for driving the output shaft both from the crankshaft and from the electric motor drive shaft.

In accordance with a first feature of the invention, a sensor element is mounted for rotation within the outer housing about a sensor element axis. Means are provided for interrelating the sensor element with the transmission for effecting rotation of the sensor element about the sensor element axis in response to the input forces upon the crankshaft. The sensor element has a first arm portion engaged with spring means for yieldably resisting rotation of the sensor element about the sensor element axis. The sensor element further has a second arm portion that is cooperable with a position sensor for sensing the angular position of the sensor element.

In accordance with another feature of the invention, a sensor element is mounted for rotation within the outer housing about a sensor element axis. Means are provided for interrelating the sensor element with the transmission for effecting rotation of the sensor element about the sensor element axis in response to input forces upon the crankshaft. At least one arm extends outwardly from the sensor element and cooperates with a biasing spring for yieldably resisting rotation of the sensor element about the sensor element axis. A roller follower is interposed in the connection between the spring and the sensor element arm for reducing frictional contact therebetween.

DETAILED DESCRIPTION OF THE PREFERRED EMBODIMENTS OF THE INVENTION EMBODIMENT OF FIGS. 2–8

Figure 2:
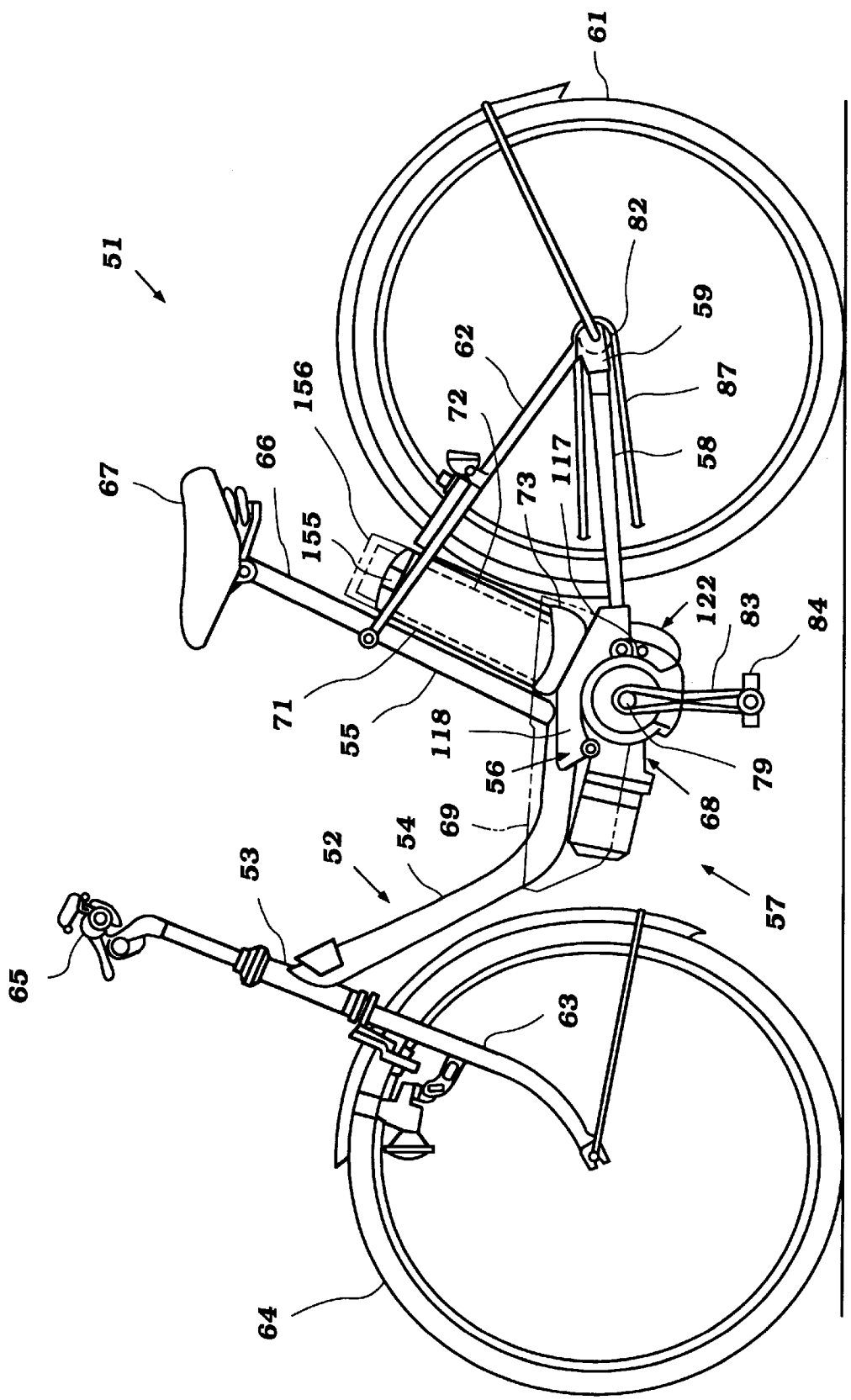
FIG. 2 is a side elevational view of a bicycle constructed in accordance with a first, preferred embodiment of the invention.

A bicycle constructed in accordance with a first embodiment of the invention is illustrated in these figures with the bicycle being shown primarily in FIG. 2. The bicycle is indicated generally by the reference numeral 51 and includes a frame assembly, indicated generally by the reference numeral 52. The frame assembly 52 includes a head pipe 53, down tube 54, and seat tube 55. The down tube 54 and seat tube 55 are connected to each other and to a bracket assembly, indicated generally by the reference numeral 56 and which includes the propulsion unit, indicated generally by the reference numeral 57 which will be described in more detail later by reference to the remaining figures.

A pair of chain stays 58 extend rearwardly from and are connected to the bracket 56. The chain stays 58, in turn, carry a rear wheel bracket 59 on which a rear wheel 61 is rotatably journaled in a known manner. A pair of seat stays 62 extend downwardly from the upper end of the seat tube 55 so as to provide triangular reinforcement for the assembly.

A front fork 63 is journaled by the head tube 53 and rotatably journals a front wheel 64. The front fork 63 is dirigibly supported in the head pipe 53 and carries a handlebar assembly 65 at its upper end for steering of the bicycle 51 in a well-known manner. A seat post 66 is slidably supported in the seat tube 55 and carries a seat 67 on which a seated rider may operate the bicycle 51.

The propulsion unit 57 will now be described by primary reference to the remaining figures of this embodiment, FIGS. 3–7, although it also appears in FIG. 2.

The propulsion unit, indicated generally by the reference numeral 57, is mounted on the underside of the bracket 56 in a manner which will be described. This propulsion unit 57 includes a drive unit 68 which has a construction as will be described. In addition and if desired, a small cover assembly 69 may be mounted on the frame assembly 52 to cover a major portion of the propulsion unit 57.

As may be seen in FIG. 2, a battery box 71 is positioned to the rear end of the seat pipe 55 and between the back stay 62. This permits a rechargeable battery 72 to be inserted or removed from the battery box 71 in a vertical direction. The battery box 71 has a base portion 73 which, as will be described, affords the electrical connection between the battery 72 and the drive unit 68. This interrelationship will be described later.

Figure 5:
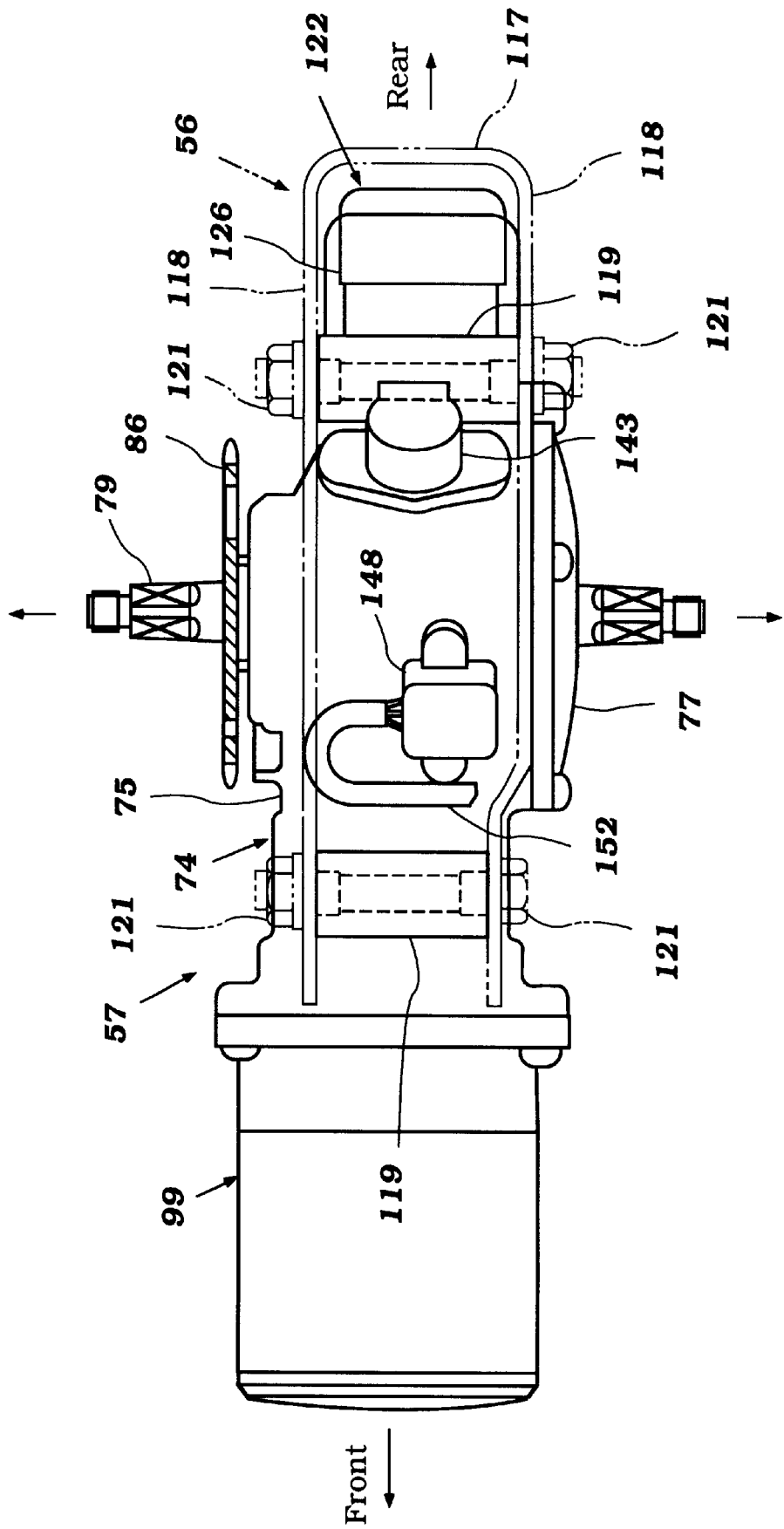
FIG. 5 is a top plan view of the construction shown in FIG. 4.
Figure 6:
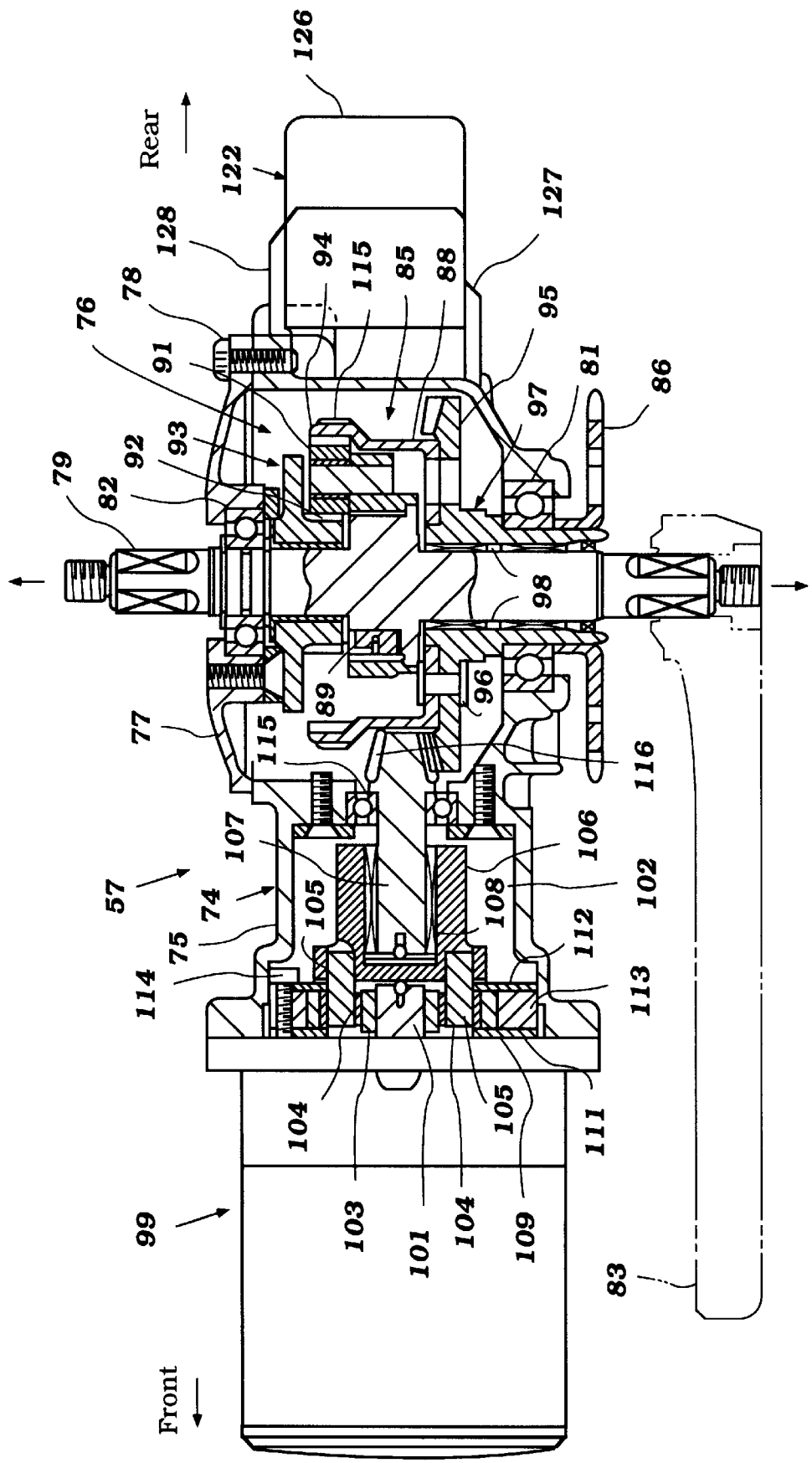
FIG. 6 is a bottom plan view of the structure shown in FIG. 5, but with a portion broken away so as to more clearly show the mechanism.
Figure 7:
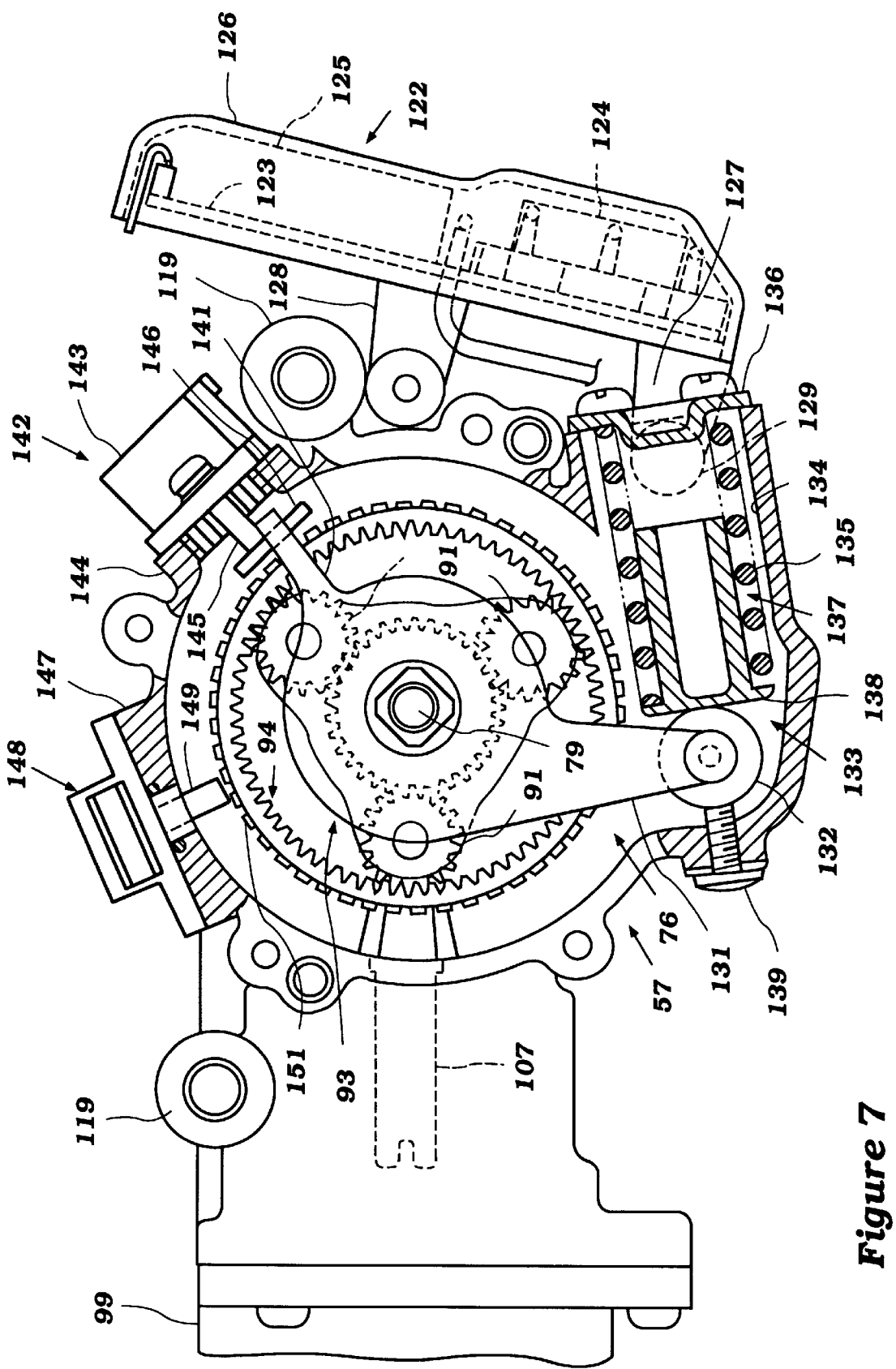
FIG. 7 is an enlarged view looking in the same direction as FIG. 4 with the cover plate removed and a portion broken away so as to show the internal construction.

Referring now primarily to FIGS. 3–8, and initially primarily to FIGS. 6 and 7, the drive unit 68 includes an outer housing, indicated generally by the reference numeral 74. This housing includes a main housing piece 75 that defines an internal cavity 76 and which is closed by a cover plate 77. Fasteners 78 provide this attachment.

A crankshaft 79 is rotatably journaled within the housing 74 by a first bearing 81, that is carried by the main housing member 75, and a second bearing 82, that is carried by the cover plate 77. Crank arms 83 are affixed to the exposed outer ends of the crankshaft 79. Pedals 84 are journalled at the outer ends of each crank arm 83 to receive the manual input force from a rider seated on the seat 67.

A first planetary type transmission, indicated generally by the reference numeral 85, is positioned within the cavity 76 and provides a step-up ratio between the crankshaft 79 and a driving sprocket 86. The sprocket 86 drives the rear wheel 61 through a chain 87 in a well known manner.

Figure 8:
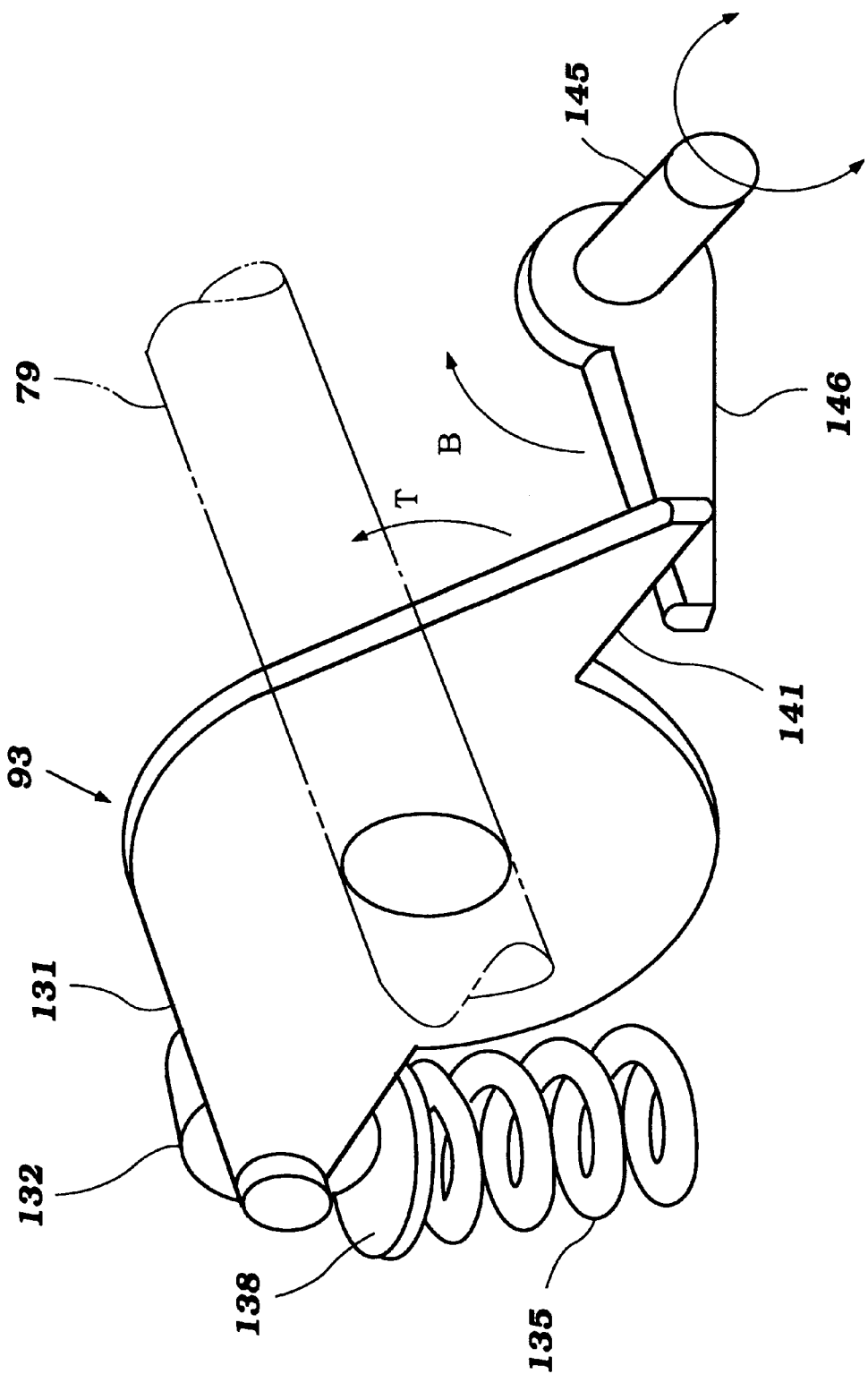
FIG. 8 is an enlarged perspective view showing the torque sensor of this embodiment.

The first planetary transmission 85 includes a planet carrier 88 that is connected to the crankshaft 79 for driving thereby via a one-way clutch 89 for the purpose already described. The planet carrier 88 carries a plurality of planet gears 91 which are enmeshed with a sun gear 92 that is mounted for limitation rotation on the crankshaft 79 for cooperation with the torque-sensing device 93 which is shown in FIGS. 7 and 8, and which will be described in more detail later.

Finally, the planet gears 91 are engaged with a ring gear 94. The ring gear 94 is connected to a further ring gear 95 by fasteners 96. The further ring gear 95 is formed with an integral tubular hub portion 97 to which the sprocket 86 is connected by a splined connection or the like. This tubular hub portion 97 is journaled on the crankshaft 79 by anti-friction bearings 98. The tubular hub portion 97 is directly journaled in the main housing member 75 by the bearings 81 so as to complete the journaling of the crankshaft 79 indirectly by the outer housing 74.

An electric assist motor, indicated generally by the reference numeral 99, is mounted so that its output shaft 101 rotates about a longitudinally extending axis which axis intersects the axis of rotation of the crankshaft 79. A planetary transmission 102 is coupled to the electric motor output shaft 101 for driving the ring gear 95 and sprocket 86 at a reduced speed ratio. This planetary transmission 102 is of the frictional type as disclosed in aforenoted U.S. Pat. No. 5,570,752, the disclosure of which is incorporated herein by reference.

Basically, this is a frictional planetary transmission that includes an input sun gear 103 that is fixed for rotation with the motor output shaft 101. This sun gear is frictionally engaged with planet gears 104 that are journaled on carrier pins 105. The carrier pins 105 are carried by a planet carrier 106 which is, in turn, connected to a pinion shaft 107 via a one-way clutch 108. The one-way clutch is employed so that the motor 99 and particularly its drive shaft 101 will not de driven by the manual force applied to the pedals 84.

Finally, the planet gears 104 are frictionally engaged with a ring gear 109. The ring gear 109 is contained between a pair of plates 111 and 112 separated by a spacer member 113. This assemblage is held in place by threaded fasteners 114 so as to maintain the positioning of the elements as described in the aforenoted United States Letters patent.

The pinion shaft 107 driven through the planetary transmission 102 is journaled by an anti-friction bearing 115. A pinion gear 116 is formed on the end of the shaft 107 and it engages the further ring gear 95 for driving the sprocket 86 in the manner already described.

The supporting bracket 56 is of an inverted U shape. That is the member 56 has an upper wall portion 117 and a pair of depending side wall portions 118 which lie on opposite sides of the drive unit 68. The drive unit outer housing 74 is formed with a pair of lugs 119. These lugs 119 pass threaded fasteners 121 that secure the drive unit 68 and specifically its outer housing 74 to the depending sides 118 of the bracket 56.

A control unit 122 is mounted directly on the drive unit outer housing 74. The control unit 122 has a circuit board 123 upon which the various components of the electrical control are mounted, as at 124. This assembly is then potted in a potting compound 125. These components are covered by a highly heat conductive metallic outer cover plate 126 that is formed with a pair of tabs 127 and 128. The tab 127 is connected to a lug 129 formed on the lower part of the housing piece 74 and which serve an additional purpose which will be described. The tab 128 is connected to a further lug 131 of the piece 75 by a threaded fastener. This arrangement assists in heat transfer from the control unit 122.

The control strategy by which the control unit 122 operates may be of any known type. Basically, however, the device operates so as to provide assist power from the electric motor 99 in proportion to the manual force input by the rider to the crank arms 83. This power assist is provided in a speed range of approximately 0 to 15 km per hour during which time the ratio of the auxiliary force to pedal force is approximately equal. As the speed increases above 15 km per hour, the assist ratio is gradually reduced and will reach zero at a speed of approximately 24 km per hour. Thus, the bicycle 51 will ride like a conventional bicycle and give normal pedal feel but require less expenditure of energy from the rider. Obviously the invention may be used with other control strategies.

The described strategy and many other types used obviously requires at least two conditions to be sensed. Therefore, the propulsion unit 57 is provided with both the aforenoted torque sensor 76, shown in most detail in FIGS. 7 and 8, and a speed sensor, shown in most detail in FIG. 7.

Referring first to the torque sensor 76, it includes the torque reaction member 93, which, as has been previously noted, is journaled for slight rotation or movement relative to the crankshaft 79 and which is formed integrally with the sun gear 92. This torque reaction member 93 has a first arm portion 131 which carries a roller 132 at its outer extremity. This roller 132 is acted on by a biasing spring assembly, indicated generally by the reference numeral 133, which is contained within the housing lug 129 and specifically within a cylindrical recess portion 134 thereof.

Figure 1:
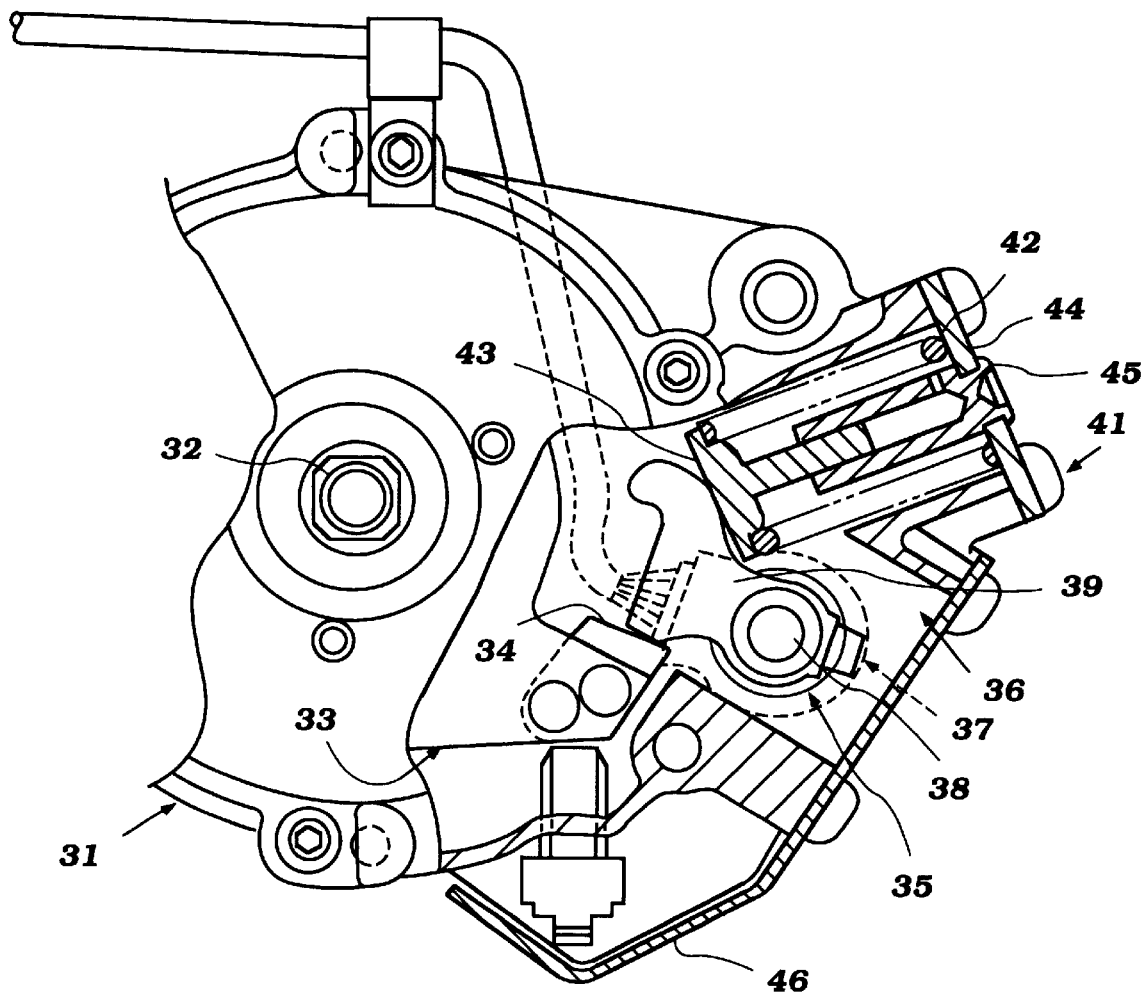
FIG. 1 is a side elevational view of a prior art type of pedal operated electric power assisted mechanism for a vehicle such as a bicycle with a portion broken away so as to show the torque sensor.

The spring assembly 133 includes a coil compression spring 135 that bears against an end plate 136 that is affixed across the open end of the cylindrical opening 134. The other end of the spring 135 engages a sliding plunger, indicated generally at 137, that has an end portion 138 which is engaged with the roller 132. Because of the use of the roller contact, friction losses and wear are avoided and the hysteresis effect with the prior type of torque sensors, for an example that of the prior art construction of FIG. 1, is avoided.

The plunger 137 extends to some extent into the spring 135 to limit its bending. There is a radial clearance, however, to reduce friction.

An adjustable stop 139 is supported in the housing member 74 and limits the at rest position of the torque reaction member 93.

Spaced from the arm 131 is a second arm 141 that is juxtaposed toward the upper part of the housing assembly 74 and specifically adjacent a potentiometer, indicated generally by the reference numeral 142. The potentiometer 221 has a sensor unit mounted in a housing 143 that is supported on a lug 144 formed on the upper rear portion of the housing 74. This permits a shaft 145 to extend into the housing cavity 76 in proximity to the torque sensing member 93 and specifically its arm 141.

The potentiometer shaft 145 is spring-biased in a direction indicated by the arrow B in FIG. 8. The potentiometer shaft 145 has a contact arm 146 affixed to it and which is engaged with a shoulder formed on the arm portion 141 of the torque sensing member 93. As a result, when a torque is exerted on the torque sensing member 93 so that it rotates in the direction indicated by the arrow T in FIG. 8, the arm 146 and potentiometer shaft 145 will rotate and follow this movement. This outputs a signal indicative of angular position that is transmitted to the control unit 122 by a short connector.

The outer housing 74 is also formed with a further lug 147 on its upper surface to which is affixed a speed sensor 148. The speed sensor 148 is also of the magnetic inductive type. It is provided with an armature around which a winding is disposed. The sensor 148 has a sensing tip 149 that extends through a further hole formed in the outer housing 74 and which is in proximity to a plurality of sensor lugs or teeth 151 formed on the outer periphery of the ring gear 94. Each time a tooth 151 passes the sensor probe 149, a pulse will be experienced that can be counted by a counter in the control unit 122 so as to provide a speed indication for the control. FIG. 5 shows a conductor 152 that can be utilized for transmission of this energy.

The housing assembly 74 is such that the two sensors 142 and 148 are positioned beneath the cover plate 56 and specifically its top surface 117 so as to be well-protected. Again, however, air can cool these sensors. This construction also permits location of the sensors in close proximity to the control 122 so as to minimize the length of external wiring and the likelihood of damage.

Figure 3:
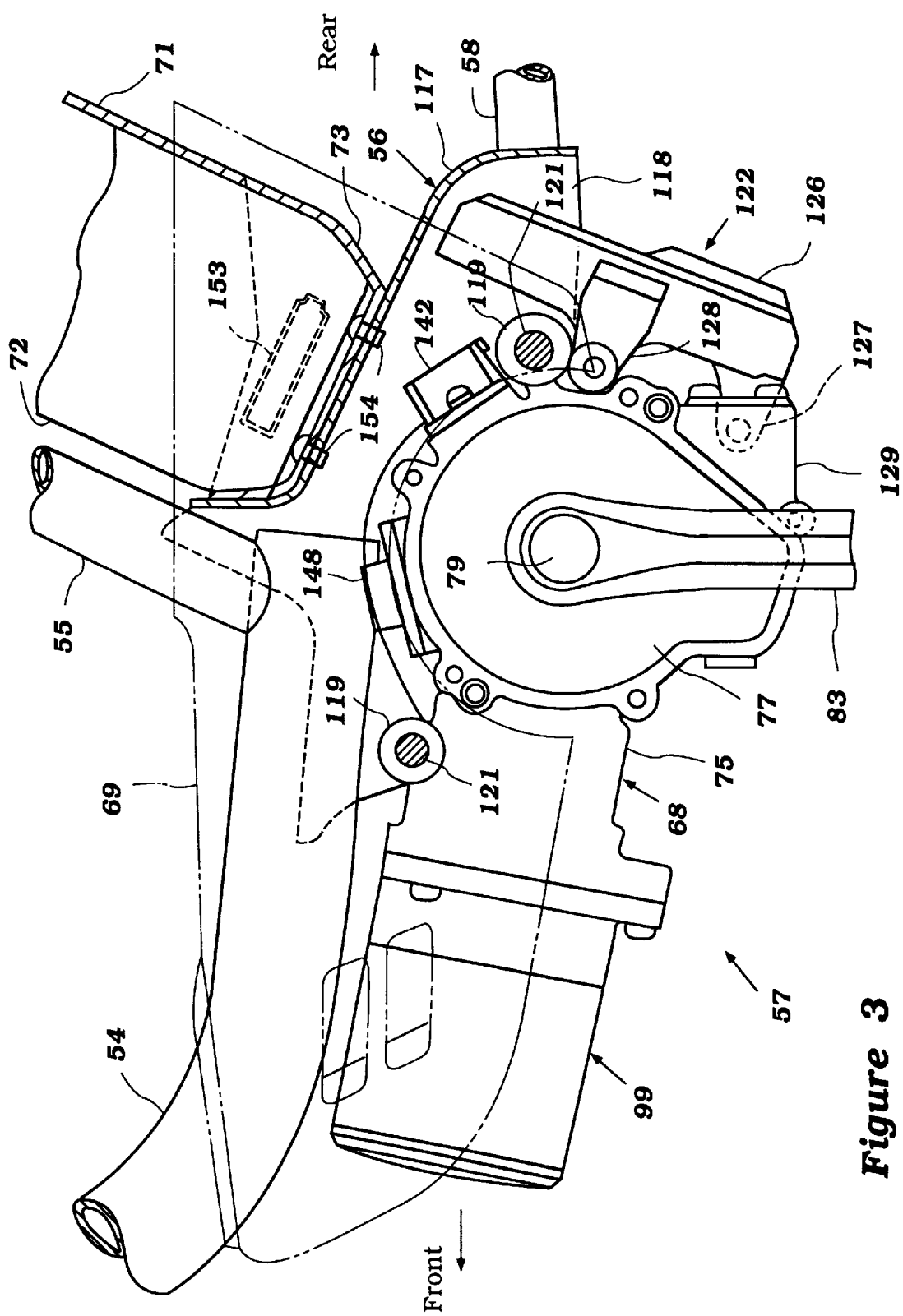
FIG. 3 is an enlarged side elevational view showing the power assist and pedal drive unit of this embodiment and the associated juxtaposed components of the bicycle.
Figure 4:
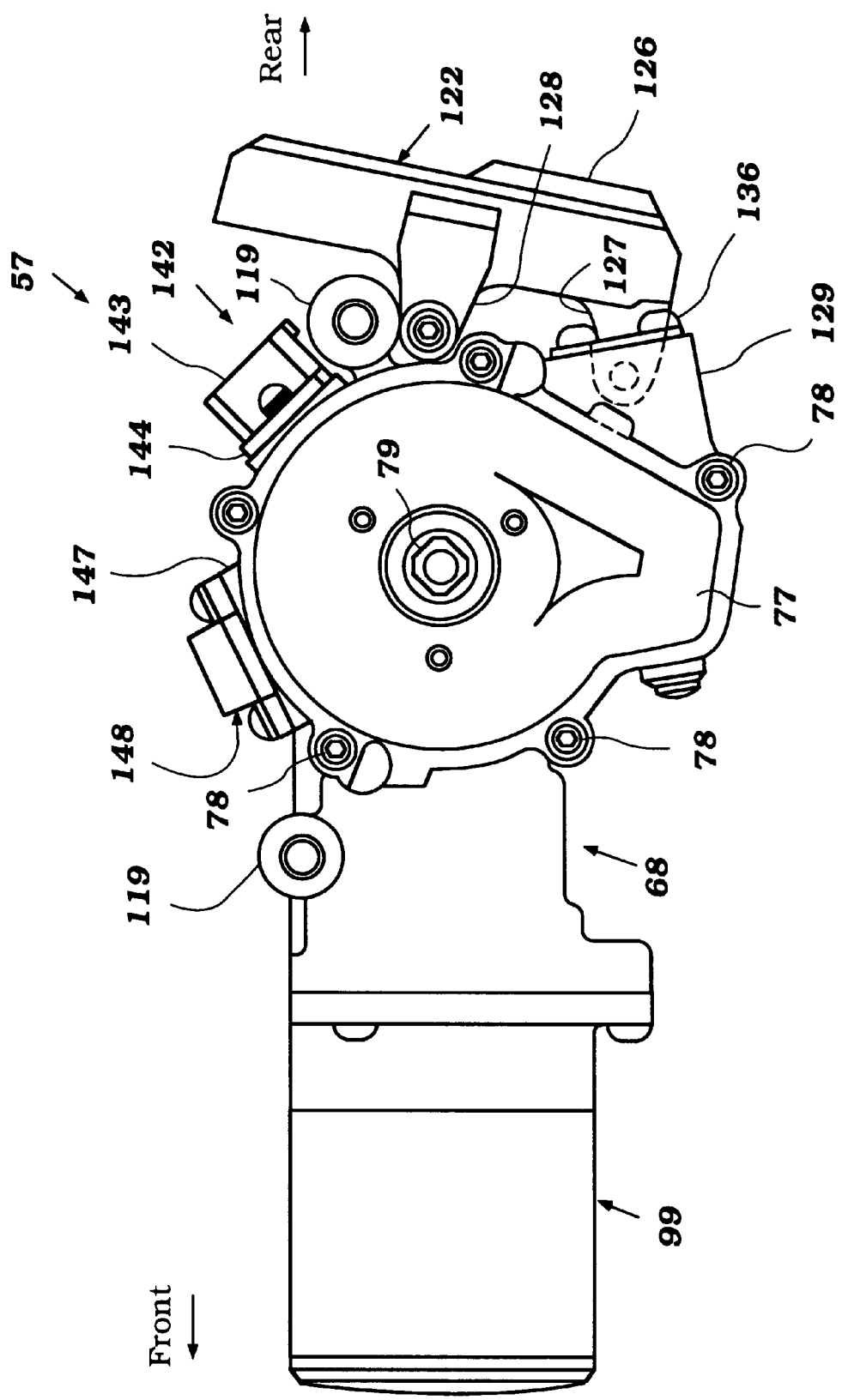
FIG. 4 is a side elevational view showing only the drive unit with the crank arms removed.

The construction of the battery case 71, battery 72 and their relation to the controls will now be described by particular reference to FIGS. 2 and 3. As may be seen in FIGS. 2 and 3, the positioning of the battery case 71 to the rear of the seat tube 55 permits it to be located quite close to the sensors 142 and 148 as well as the control 122.

The battery 72 has a terminal 153 at its lower end and this contacts a terminal in the battery case 72 which is not shown, which establishes an external electrical connection when the battery 72 is installed in the battery case 71. The battery case 71 is fixed to the bracket 56 by threaded fasteners 154. Thus, it will be seen that there is only a very short electrical path between the battery 72, the motor 99 and the various controls and sensors. This further improves the reliability of the system.

The battery case 71 has a cover that receives a terminal or charging connector 155. In addition, a folding handle 156 is provided on the battery 72 so as to permit its removal for charging at a remote source if desired.

EMBODIMENT OF FIG. 9

Figure 9:
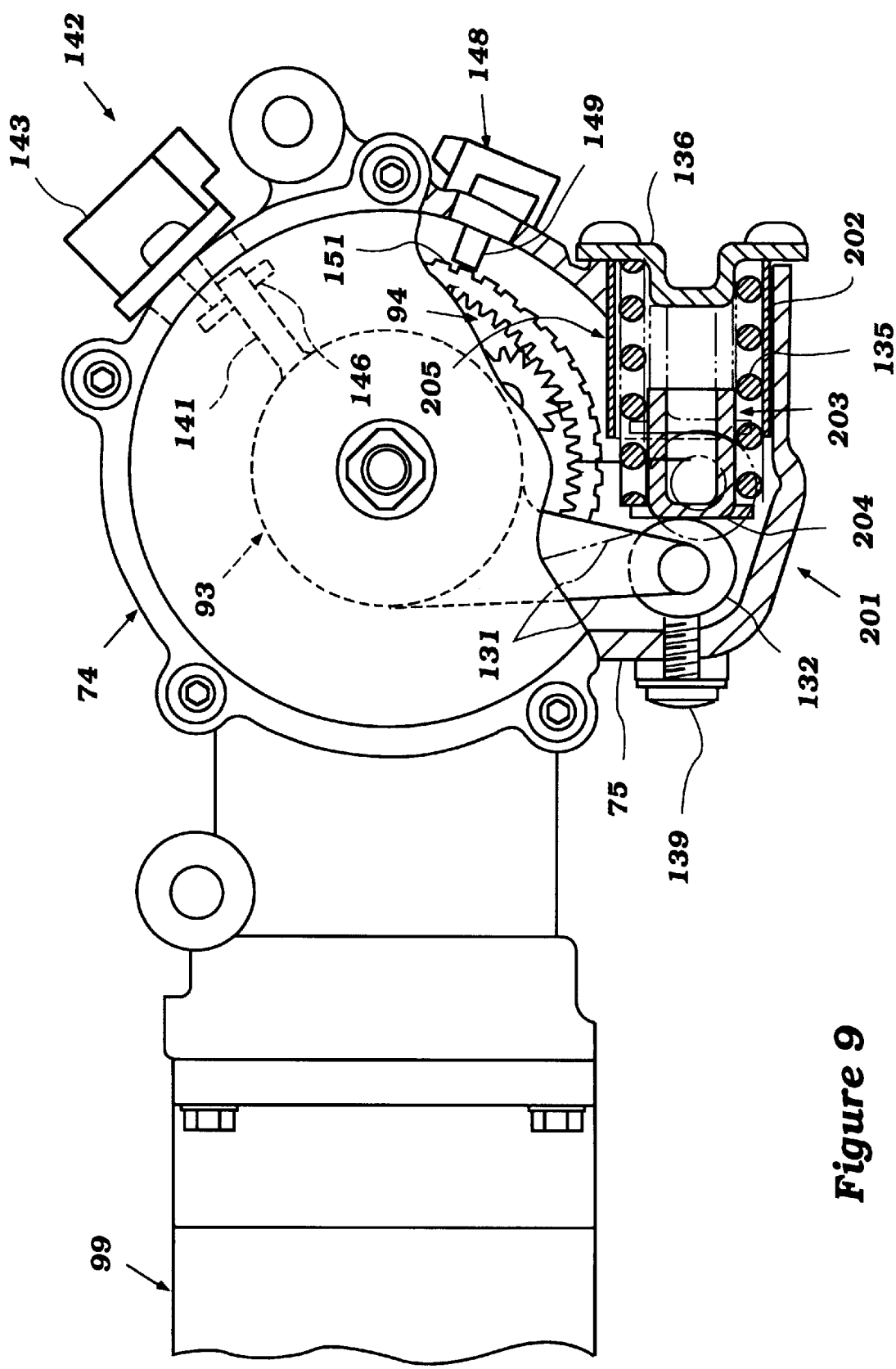
FIG. 9 is a partial side elevational view, in part similar to FIG. 7, but with a lesser part broken away and shows a second embodiment of the invention.

FIG. 9 shows another embodiment of the invention which is basically the same as the embodiment thus far described. This embodiment differs from the previous embodiment in two regards. One deals with the biasing spring arrangement for the torque sensor, this spring arrangement being indicated generally by the reference numeral 201, and the other is the positioning of the speed sensor, which is the same in construction, but different in location from the previously-described embodiment. Therefore, the speed sensor has been identified by the same reference numeral 148 and its construction and operation will not be described again.

In this embodiment where components are the same or substantially the same as those previously described, they have been identified by the same reference numerals and will not be described again, except insofar as is necessary to understand the construction and operation of this embodiment.

In this embodiment, the spring arrangement 201 is again placed in a recess 202 that is formed at the lower portion of the main housing assembly 74 in the main housing member 75. In this embodiment, the axis of the opening 202 extends generally parallel to the axis of the output shaft of the electric motor 99. Again, the opening 202 is closed by a cover plate 136 in the manner previously described.

In this embodiment, a plunger member, indicated generally by the reference numeral 203, passes through the interior of the coil compression string 135 with a clearance. The plunger member 203 has an end portion 204 which is engaged with the roller follower 132 so as to urge the torque sensing device 93 toward the steady rest stop 139.

A cylindrical guide 205 is fitted into the bore 202 and is held in place by the cover plate 136. This guide 205 acts to eliminate bending of the spring 135 and hence the plunger 203 can be made considerably shorter and friction losses avoided.

EMBODIMENT OF FIGS. 10–12

Figure 10:
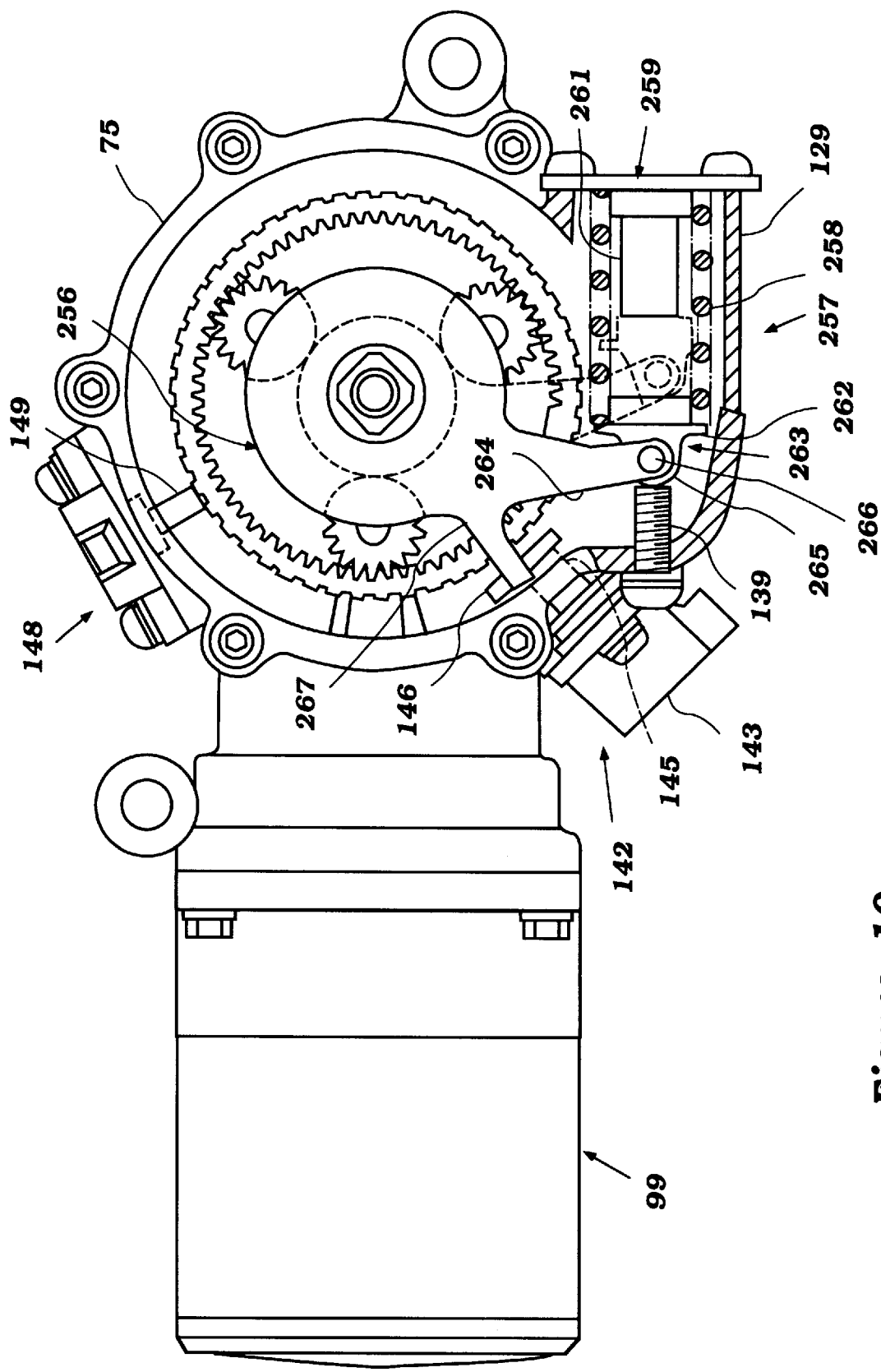
FIG. 10 is a partial side elevational view, in part similar to FIGS. 7 and 9, and shows a third embodiment of the invention.
Figure 11:
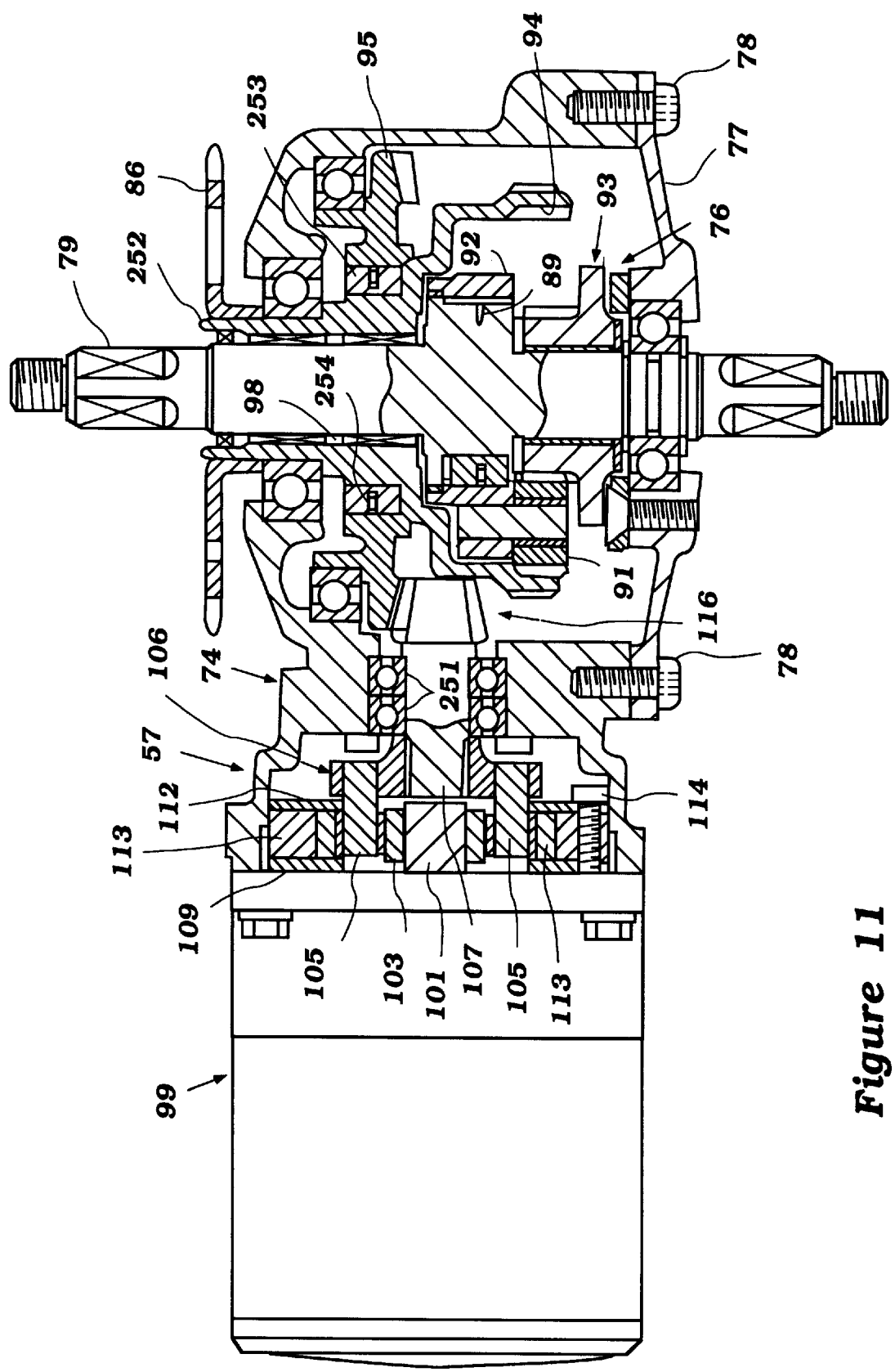
FIG. 11 is a bottom plan view of the third embodiment, with a portion broken away, so as to more clearly show the transmission of this embodiment.
Figure 12:
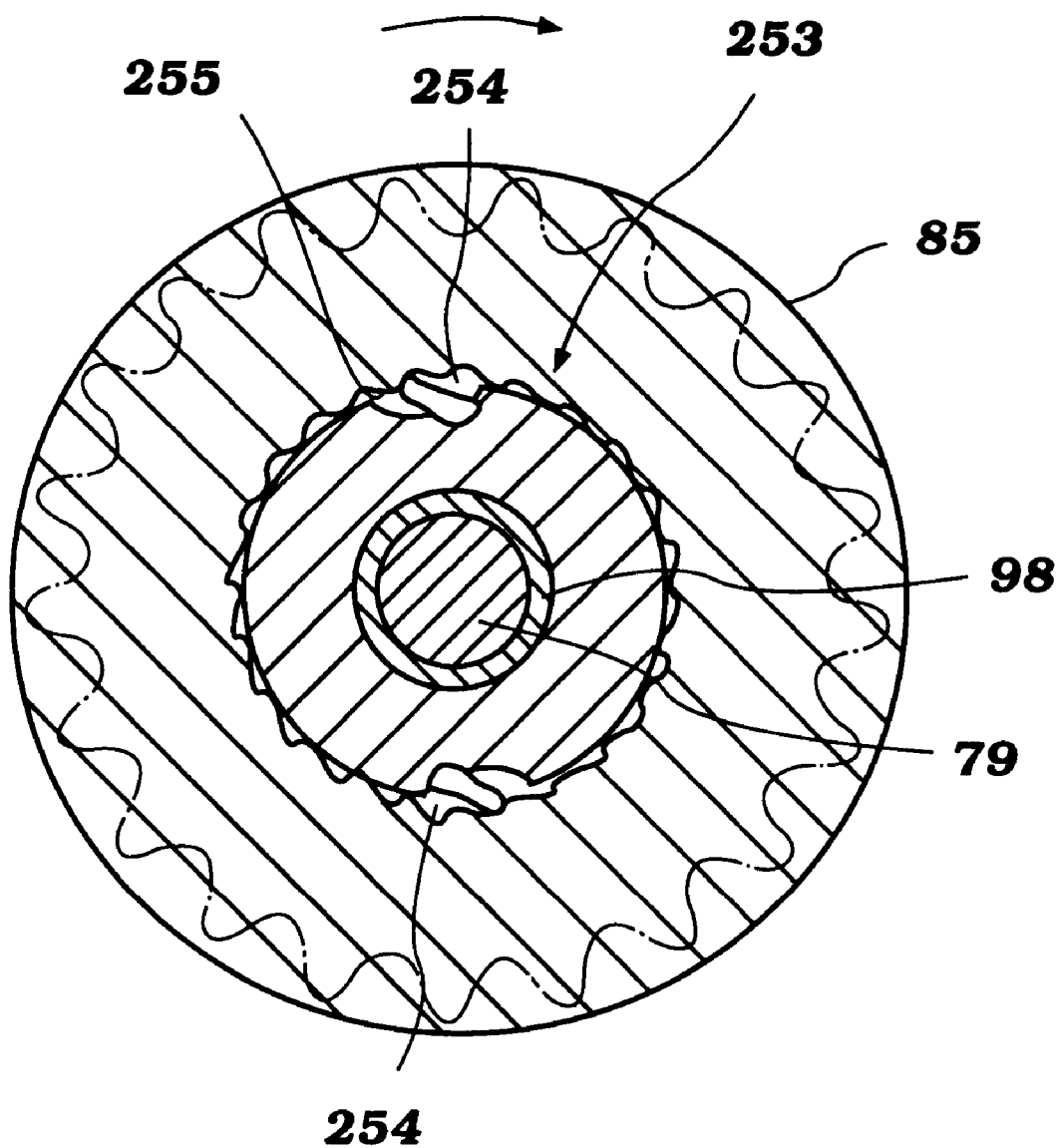
FIG. 12 is a cross-sectional view showing one of the one-way clutches in the transmission of this third embodiment and which is typical of the one-way clutches utilized in the invention.

FIGS. 10 through 12 show another embodiment which is generally similar to those previously described. For that reason, when components of this embodiment are the same or substantially the same as those previously described, they have been identified by the same reference numerals and will not be described again, except where necessary to understand the construction and operation of this embodiment.

In this embodiment, the pinion gear shaft 107 is not connected to the carrier 106 via a one-way clutch. Rather, a spline connection is provided and a pair of ball bearings 251 journal the pinion shaft 107.

In this embodiment, the pinion gear 116 meshes with the ring gear 95 and the ring gear 95 is connected to a sleeve shaft 252 via a one-way clutch 253. This one-way clutch 253 serves the same purpose as the one-way clutch 108 in the first mentioned embodiment, that of FIGS. 2 through 7. The sleeve shaft 252 in this embodiment is formed integrally that with that of the carrier 88.

FIG. 12 shows the detail of the one-way clutch 253 between the ring gear 95 and the sleeve shaft 252. Like the previous embodiment, the sprockets 86 is connected by a spline connection or the like to this sleeve shaft 252. The one-way clutch is comprised of pawl numbers 254 that are carried in grooves or slots formed in the sleeve shaft 252 and which are engaged with ratchet teeth 255 formed on the interior of the ring gear 95. This type of clutch is well known in the art and further description of it is not believed to be necessary.

In this embodiment, a slightly different arrangement is also provided for preloading the torque sensor, indicated by the reference numeral 256 in FIG. 10. It should also be noted that the potentiometer 142 is moved so as to be juxtaposed to the biasing spring arrangement, indicated generally by the reference numeral 257. This biasing spring arrangement 257 is again formed in a lug 129 in the main housing piece 75 and contains a coil compression spring 258 held in place by a cover plate 259.

A plunger member 261 is received within this spring 258 and has an end portion 262 that forms a connection, indicated generally by the reference numeral 263, with an arm 264 of the torque sensing device 256. This connection includes a trunion 265 that is connected by in means of a pivot pin 266 to the end of the torque sensing arm 264. This pin connection has some clearance so as to accommodate the pivotal movement without bending of the spring 258.

The potentiometer 142 has its outer housing 143 containing a potentiometer juxtaposed to the lug 129. The potentiometer shaft 145 extends into proximity to a potentiometer arm 267 formed in proximity to the arm 264 and which contacts potentiometer follower 146. Thus, the construction and operation of this embodiment should also be readily apparent to those skilled in the art without further description and from that description which has preceded this.

EMBODIMENT OF FIG. 13

Figure 13:
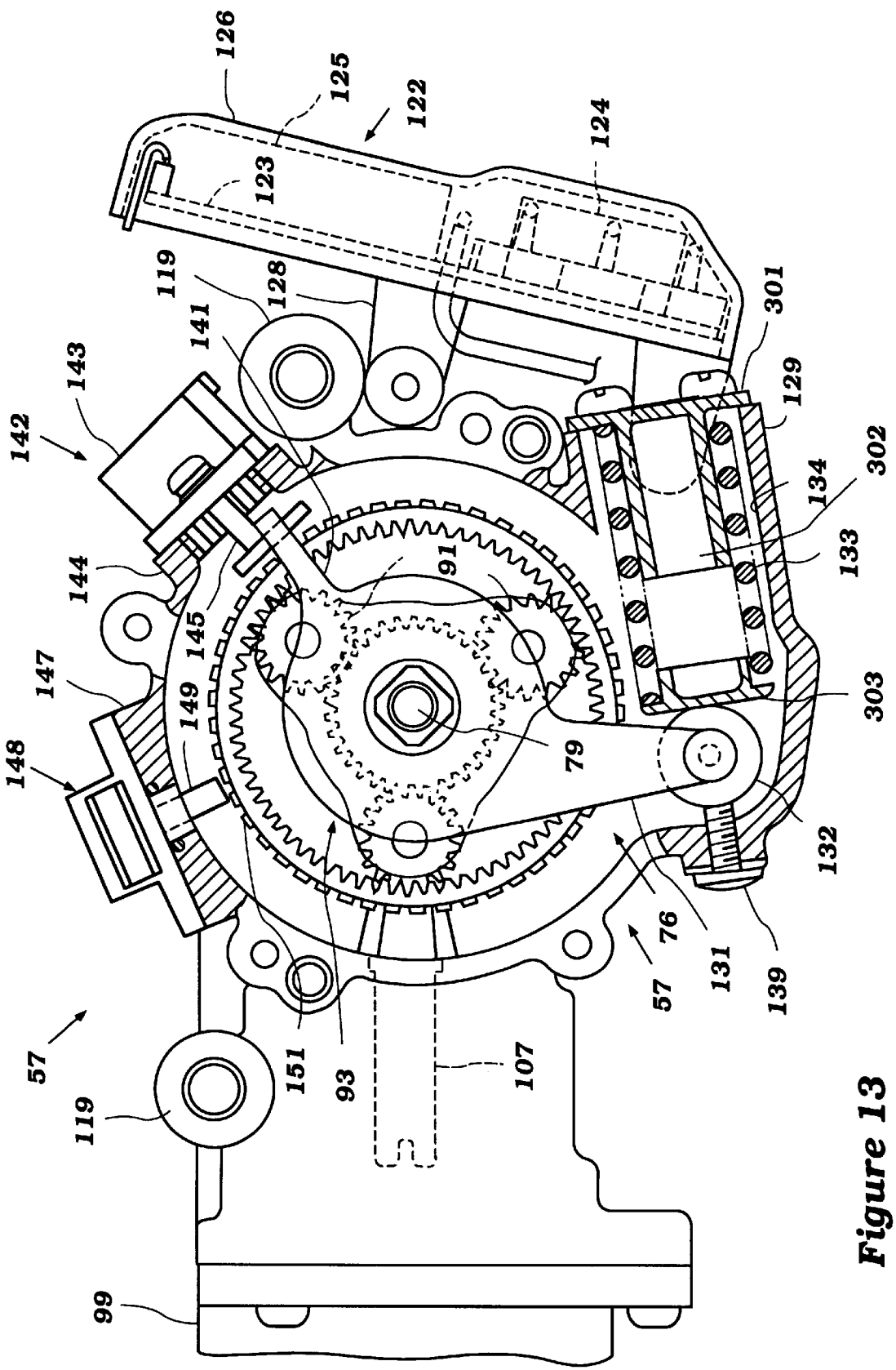
FIG. 13 is a side elevational view, in part similar to FIGS. 7, 9 and 10, and shows yet another embodiment of the invention.

FIG. 13 shows yet another embodiment of the invention which is basically quite similar to the embodiment of FIGS. 2 through 8. In this embodiment, however, a slightly different spring arrangement is employed for the torque sensing member. Aside from this, all other components have been identified by the same reference numerals as applied to the components in FIGS. 2 through 8 and these components will not be described again.

Again, the outer housing lug 129 is formed with a cavity 134 in which the biasing spring 135 is contained. In this embodiment, however, an end closure 301 has a tubular cylindrical extension 302 around which the spring 133 is received. This extension will prevent significant bending of the spring 133 and hence a relatively short plunger 303 may be employed for contact with the follower 132.

EMBODIMENT OF FIGS. 14 AND 15

Figure 14:
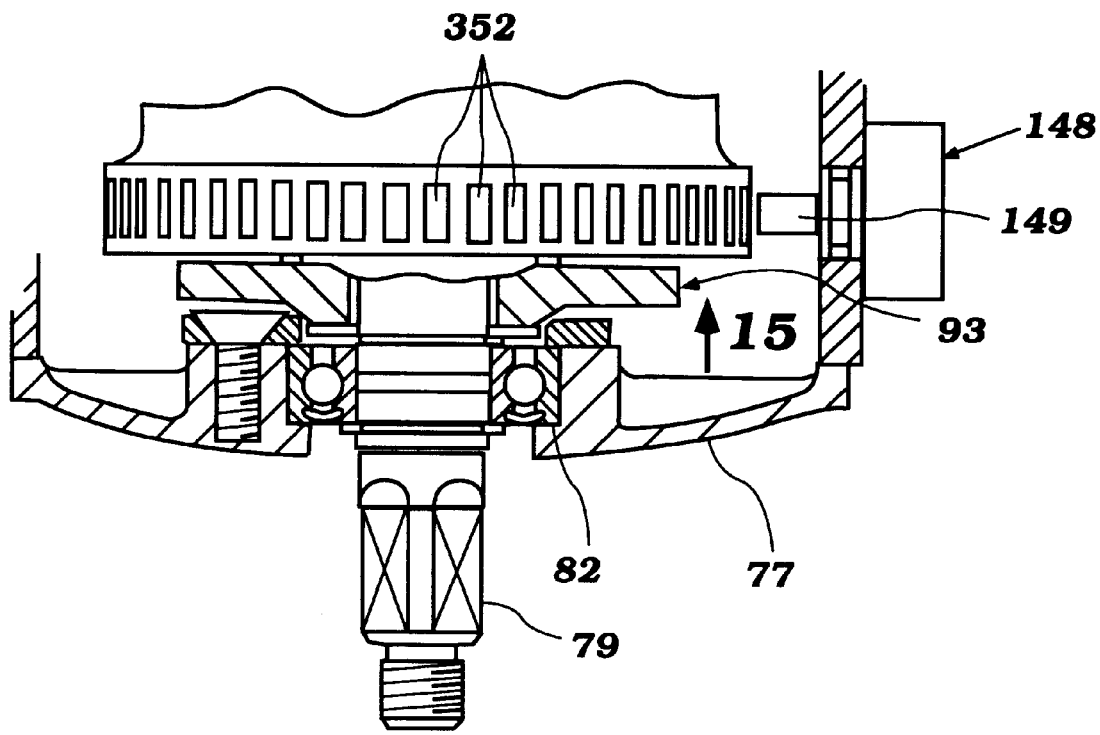
FIG. 14 is a partial cross-sectional view showing another embodiment of a speed sensor arrangement.
Figure 15:
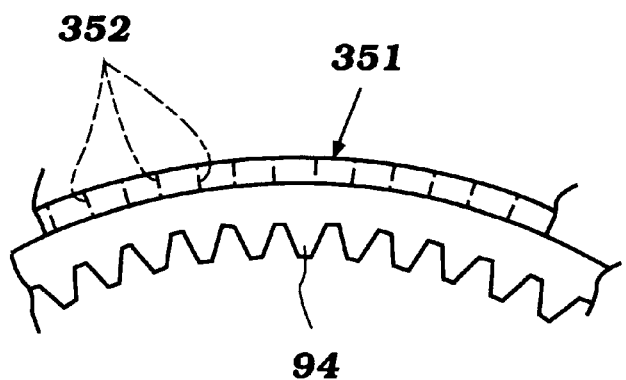
FIG. 15 is a view looking in the direction of the arrow 15 in FIG. 14.
Figure 16:
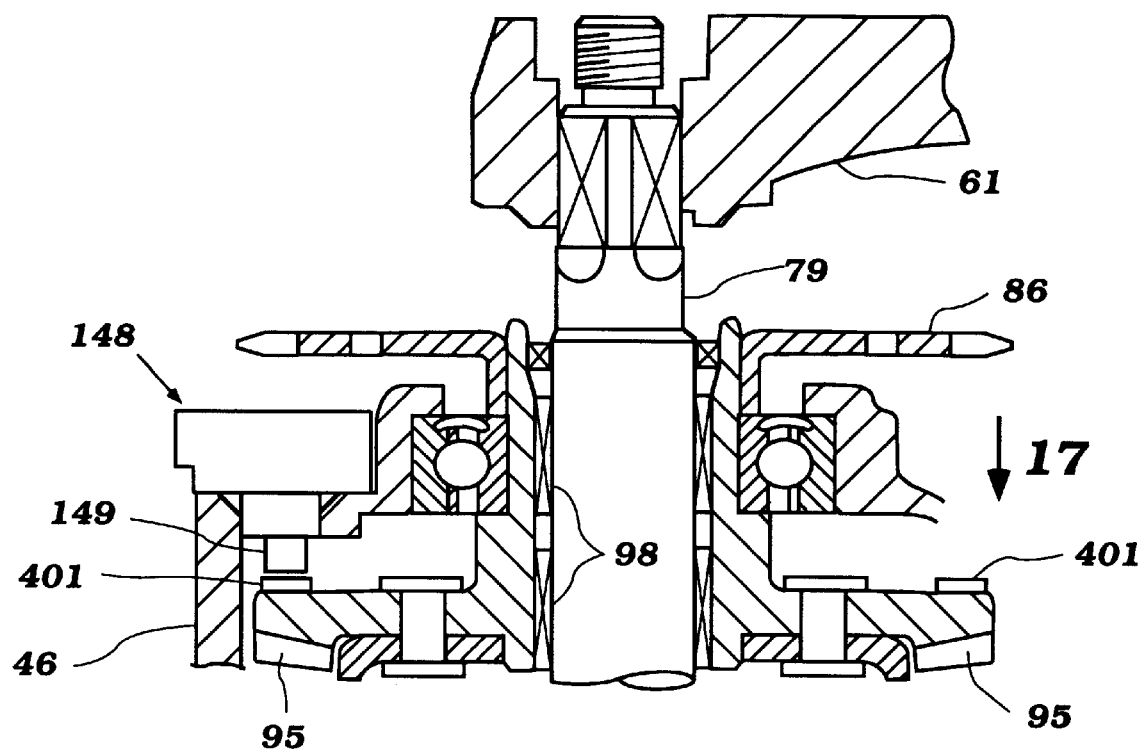
FIG. 16 is a view in part similar to FIG. 14 and shows a still further embodiment of speed sensor.
Figure 17:
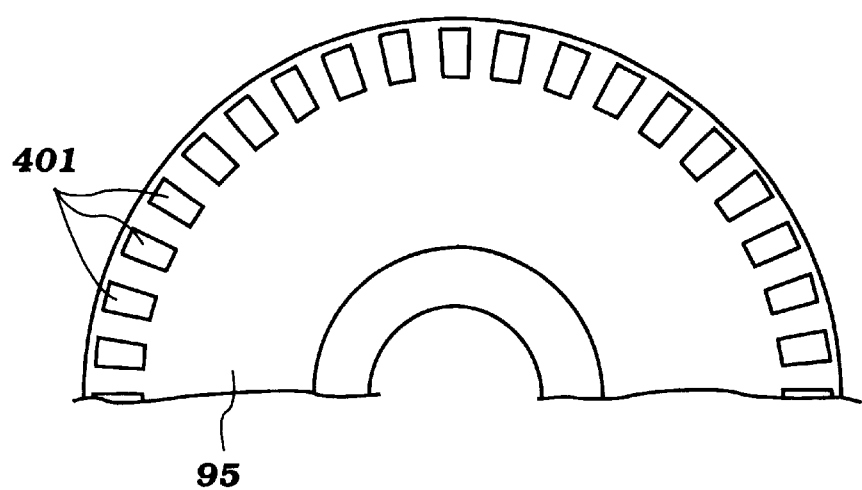
FIG. 17 is a view looking in the direction of the arrow 17 in FIG. 16.

FIGS. 14 and 15 are partial views which show another type of speed sensors. As this is the only difference from the previous embodiment and since any of the types of sensor arrangements and biasing arrangements as disclosed in those embodiments can be employed, further description of those contents in connection with this embodiment is not believed to be necessary.

In this embodiment, however, the ring gear, indicated generally by reference numerous 351 has a rim portion that extends around the ring gear 94. This rim portion is formed with cut-outs or slots 352 which will function so as to provide the pulses in the speed sensor 148 as with the previously described embodiment.

EMBODIMENT OF FIGS. 16 AND 17

Again, this embodiment differs from the previously described embodiments only in the way in which the speed signal is generated. In this embodiment, the speed sensor 148 is mounted so that its sensor probe 149 extends not in a radial direction, as with the previous embodiments, but in an axial direction. Also, the sensor cooperates directly with the ring gear 95 and to this end the ring gear 95 is provided with lugs 401 on its outer face which are juxtaposed to the sensor probe 149 and will provide the output speed signals.

Thus, from the foregoing description it should be readily apparent that the described embodiments of the invention provide a very compact arrangement and one in which the speed torque sensor is constructed in such a way that where and hysteresis effects will be substantially minimized while without sacrificing cost or performance. Of course, the foregoing description are those of preferred embodiments of the invention and various changes and modifications may be made without departing from the spirit and scope of the invention as defined by the appended claims.

I claim:

1. An electric motor assisted and manual power operated drive assembly for a vehicle and control therefor, said assembly comprising an outer housing for journaling a crankshaft for rotation about a crankshaft axis, said crankshaft having opposite ends protruding from said outer housing and adapted to receive crank arms and pedals for application of manual power to said crankshaft, an electric motor having a drive shaft and supported by said outer housing, an output shaft journaled within said outer housing for driving the associated vehicle, a transmission contained within said outer housing for driving said output shaft from said crankshaft and said electric motor drive shaft, a sensor element mounted for rotation within said outer housing about a sensor element axis, and means for interrelating said sensor element with said transmission for effecting rotation of said sensor element about said sensor element axis in response to input forces on said crankshaft, said sensor element having a first arm portion engaged with spring means for yieldably resisting rotation of said sensor element about said sensor element axis and second arm portion cooperating with a position sensor for sensing the angular position of said sensor element.

2. An electric motor assisted and manual power operated drive assembly for a vehicle and control therefor as set forth in the claim 1 wherein the position sensor comprises a potentiometer having a shaft extending into the outer housing.

3. An electric motor assisted and manual power operated drive assembly for a vehicle and control therefor as set forth in claim 2 wherein the potentiometer shaft has an axis that extends perpendicularly to the crankshaft axis.

4. An electric motor assisted and manual power operated drive assembly for a vehicle and control therefor as set forth in claim 2 wherein the potentiometer shaft axis extends parallel to the crankshaft axis.

5. An electric motor assisted and manual power operated drive assembly for a vehicle and control therefor as set forth in claim 2 wherein at least a portion of the transmission comprises a planetary transmission and the sensor element cooperates with a member of the planetary transmission said transmission member being permitted to rotate only slightly and the sensor element senses the degree of rotation of said transmission member.

6. An electric motor assisted and manual power operated drive assembly for a vehicle and control therefor as set forth in claim 5 wherein the member of the planetary transmission comprises a sun gear.

7. An electric motor assisted and manual power operated drive assembly for a vehicle and control therefor as set forth in claim 5 wherein the member of the planetary transmission comprises a planet carrier.

8. An electric motor assisted and manual power operated drive assembly for a vehicle and control therefor as set forth in claim 1 wherein the spring means engages the first arm via a roller connection.

9. An electric motor assisted and manual power operated drive assembly for a vehicle and control therefor as set forth in claim 8 wherein the roller connection is carried by the spring means and engages a surface on the first arm.

10. An electric motor assisted and manual power operated drive assembly for a vehicle and control therefor as set forth in claim 1 wherein the spring means is connected to the sensor element first arm via a pivotal connection.

11. An electric motor assisted and manual power operated drive assembly for a vehicle and control therefor as set forth in claim 1 wherein the spring means comprises a coil spring.

12. An electric motor assisted and manual power operated drive assembly for a vehicle and control therefor as set forth in claim 11 wherein a cylindrical member engages the coils of the coil spring loosely to control its bending.

13. An electric motor assisted and manual power operated drive assembly for a vehicle and control therefor as set forth in claim 12 wherein the cylindrical member is positioned within the coil spring.

14. An electric motor assisted and manual power operated drive assembly for a vehicle and control therefor as set forth in claim 13 wherein the cylindrical member is fixed to the outer housing.

15. An electric motor assisted and manual power operated drive assembly for a vehicle and control therefor as set forth in claim 12 wherein the cylindrical member is carried by the coil spring.

16. An electric motor assisted and manual power operated drive assembly for a vehicle and control therefor as set forth in claim 12 wherein the cylindrical member encircles the coil spring.

17. An electric motor assisted and manual power operated drive assembly for a vehicle and control therefor, said assembly comprising an outer housing for journaling a crankshaft for rotation about a crankshaft axis, said crankshaft having opposite ends protruding from said outer housing and adapted to receive crank arms and pedals for application of manual power to said crankshaft, an electric motor having a drive shaft and supported by said outer housing, an output shaft journaled within said outer housing for driving the associated vehicle, a transmission contained within said outer housing for driving said output shaft from said crankshaft and said electric motor drive shaft, a sensor element mounted for rotation within said outer housing about a sensor element axis, means for interrelating said sensor element with said transmission for effecting rotation of said sensor element about said sensor element axis in response to input forces on said crankshaft, said sensor element having a first arm portion, spring means, and roller follower interposed in the connection between the spring and the sensor element arm for reducing frictional contact therebetween for yieldably resisting rotation of said sensor element about said sensor element axis.

18. An electric motor assisted and manual power operated drive assembly for a vehicle and control therefor as set forth in claim 17 wherein the roller follower is carried by the spring means and engages a surface on the arm.

19. An electric motor assisted and manual power operated drive assembly for a vehicle and control therefor as set forth in claim 18 wherein the spring means comprises a coil spring.

20. An electric motor assisted and manual power operated drive assembly for a vehicle and control therefor as set forth in claim 17 wherein a cylindrical member engages the coils of the coil spring loosely to control its bending.

21. An electric motor assisted and manual power operated drive assembly for a vehicle and control therefor as set forth in claim 20 wherein the cylindrical member is positioned within the coil spring.

22. An electric motor assisted and manual power operated drive assembly for a vehicle and control therefor as set forth in claim 21 wherein the cylindrical member is fixed to the outer housing.

23. An electric motor assisted and manual power operated drive assembly for a vehicle and control therefor as set forth in claim 21 wherein :.he cylindrical member is carried by the coil spring.

24. An electric motor assisted and manual power operated drive assembly for a vehicle and control therefor as set forth in claim 20 wherein the cylindrical member encircles the coil spring.

* * * * *

UNITED STATES PATENT AND TRADEMARK OFFICE
CERTIFICATE OF CORRECTION

PATENT NO. : 5,915,493  
DATED : June 29, 1999  
INVENTOR(S) : Hironori Nakayama It is certified that error appears in the above-identified patent and that said Letters Patent is hereby corrected as shown below:

Column 12,  
Line 19, please change ":.he" to -- the --.

Signed and Sealed this

Fourth Day of May, 2004

JON W. DUDAS  
*Acting Director of the United States Patent and Trademark Office*